(12) United States Patent
Anderson (10) Patent No.: US 9,862,300 B1
(45) Date of Patent: Jan. 9, 2018

(54) RATCHETING STRAP WITH TAKE-UP REEL

(71) Applicant: Remington Industries, Inc., Ooltewah, TN (US)

(72) Inventor: Erik Edward Anderson, Cleveland, TN (US)

(*) Notice: Subject to any disclaimer, the term of this patent is extended or adjusted under 35 U.S.C. 154(b) by 0 days.

(21) Appl. No.: 15/660,059

(22) Filed: Jul. 26, 2017

Related U.S. Application Data (60) Provisional application No. 62/413,023, filed on Oct. 26, 2016, provisional application No. 62/414,758, filed on Oct. 30, 2016.

(51) Int. Cl.
| | | |
|---|---|---|
| *B60P 7/08* | (2006.01) | |
| *B60P 7/06* | (2006.01) | |
| *B65H 54/58* | (2006.01) | |
| *B65H 75/44* | (2006.01) | |
| *B60P 7/00* | (2006.01) | |
| *B65H 54/00* | (2006.01) | |

(52) U.S. Cl.
CPC ........... *B60P 7/0846* (2013.01); *B60P 7/06* (2013.01); *B65H 54/585* (2013.01); *B65H 75/4494* (2013.01); *B60P 7/00* (2013.01); *B65H 54/00* (2013.01)

(58) Field of Classification Search
CPC ....... B60P 7/0846; B60P 7/06; Y10T 24/2175
See application file for complete search history.

(56) References Cited

U.S. PATENT DOCUMENTS

| | | | |
|---|---|---|---|
| 5,611,520 A | 5/1997 | Soderstrom | |
| 6,102,371 A | 8/2000 | Wyers | |
| 6,609,275 B1 | 8/2003 | Lin | |
| 7,100,901 B2 | 9/2006 | Gleinser | |
| 7,296,326 B2 | 11/2007 | Madachy | |
| 7,861,382 B1 | 1/2011 | Madachy | |
| 8,172,203 B2 | 5/2012 | Chou | |
| 8,360,202 B1 * | 1/2013 | Woodard | A62B 1/16 182/3 |
| 8,370,997 B2 | 2/2013 | Wright | |
| 2003/0145434 A1* | 8/2003 | Lin | B60P 7/0823 24/68 CD |

(Continued)

*Primary Examiner* — Robert J Sandy
(74) *Attorney, Agent, or Firm* — Frank Marino (57) ABSTRACT

A ratcheting strap device has an elongate body with a reel axis towards a first end and a ratcheting mechanism towards a second end opposite there-from. The ratcheting mechanism is affixed to the body, and has a spool axis and a ratchet spool rotatable relative to the body there-about. A first strap/hook member has a first length of strap affixed to a first one of the ratcheting mechanism and the body at a first proximal end, and has a first hook affixed to a first distal end there-of. A take-up reel is affixed to the body and rotational relative thereto about the reel axis. A second strap hook member has a second length of strap having a second proximal end connectable to the take-up reel, has a take-up strap portion adjacent to the second proximal end and windable around the take up reel, and has a second hook affixed to a second distal end there-of. The second length of strap has a midsection between its second proximal and distal ends, passing through and engageable by the ratchet spool such that rotation of the spool causes the midsection to be wound there-around.

16 Claims, 6 Drawing Sheets

(56) References Cited

U.S. PATENT DOCUMENTS

| | | | |
|---|---|---|---|
| 2004/0084558 A1* | 5/2004 | Huang | B60P 7/0846 |
| | | | 242/385.4 |
| 2004/0094650 A1 | 5/2004 | Huang | |
| 2009/0025185 A1* | 1/2009 | Banes | B65D 63/18 |
| | | | 24/3.1 |
| 2010/0247265 A1 | 9/2010 | Jensen | |
| 2011/0146035 A1 | 6/2011 | Lu | |
| 2013/0291353 A1* | 11/2013 | Lu | B60P 7/0846 |
| | | | 24/68 E |

* cited by examiner

RATCHETING STRAP WITH TAKE-UP REEL

RELATED APPLICATIONS

This application claims all entitled Priority to U.S. Provisional Applications No. 62/413,023 filed on 26 Oct. 2016, and No. 62/414,758 filed on 30 Oct. 2016, the entire teachings of which are incorporated herein by reference.

FIELD OF THE INVENTION

The present invention is related to devices and systems for securing one or more objects to one or more others. More specifically, the present invention is related to securement straps, such as ratcheting straps, for securing one or more articles, such as to or within a vehicle.

BACKGROUND

Ratcheting straps can be used to secure a wide variety of objects to various support surfaces and/or to various other objects. Typically, such straps are used to keep an object from falling or moving relative to a vehicle during transport. Such ratcheting straps typically have two portions; a long strap/hook, and a ratcheting strap sub-assembly including a short strap hook. Each strap/hook has a hook at one end which attaches to say an immovable anchor feature in or on the vehicle. The long strap/hook has a long webbing with its hook at one end. The short strap/hook has a short webbing with its hook at one end and a ratcheting mechanism at the other end. The non-hook end of the free strap sub-assembly's long webbing is fed into the ratcheting sub-assembly and adjusted to near its intended final length, then the hooks are secured to the vehicle and the long webbing is wrapped loosely around the object and the ratcheting mechanism is activated to reel in the slack of the long webbing and tightly secure the object to the vehicle. Such ratcheting straps are exemplified by U.S. Pat. Nos. 5,271,606 and 7,874,047, the entire teachings of which are incorporated herein by reference.

Users feed the webbing of such prior art ratcheting straps into the ratcheting mechanism prior to use. Because prior art ratchet straps lack any effective means for efficiently and neatly being stored, except for rolling the webbing up around the ratcheting mechanism and wrapping with an elastic band or such, users often release and remove the webbing therefrom after every use. The two portions are then stored for future use by rolling up the free strap sub-assembly and placing it and the "dangly" ratcheting strap sub-assembly under the vehicle's seat or in the trunk.

Obviously, this storage arrangement poses problems, not limited to the inability to find both assemblies when needed, the unrolling of the free strap sub-assembly and tangling thereof with other items in nearby storage, the catching of one of the hooks on the underside of the car seat, the unrolling and tangling of the free strap sub-assembly with itself, and the general messiness caused by having such assemblies strewn about the vehicle.

Accordingly, there is a need, and it is an object of the invention, to provide a means for simply and consistently storing a ratcheting strap. There is a need, and it is an object of the invention, to provide such a means that allows the user to leave the ratcheting strap assemblies connected during such storage into a single neat device. There is a need, and it is an object of the invention, to provide such a means that minimizes the space required for such storage. There is a need, and it is an object of the invention, to provide such a means that neatens such storage. There is a need, and it is an object of the invention, to provide such a means that prevents the hooks from getting caught on other features within the vehicle.

Further needs and objects exist which are addressed by the present invention, as may become apparent by the included disclosure of an exemplary embodiment thereof.

SUMMARY OF THE INVENTION

The invention may be embodied in or practiced using a ratcheting strap kit consisting of such a ratcheting strap as referred to above together with a take-up reel arranged to receive and retain the long strap/hook such that the long strap/hook may be in permanent assembly with the ratcheting mechanism in a configuration that addresses the afore-stated problems and addresses the afore-stated needs.

The invention may be embodied in or practiced using a ratcheting strap device with a body, a ratcheting mechanism affixed to the body and comprising a ratchet spool rotatable relative to the body, a first strap/hook member comprising a first length of strap affixed to a first one of the ratcheting mechanism and the body at a first proximal end, and having a first hook affixed to a first distal end there-of. A take-up reel may be affixed to the body and rotational relative thereto. The device may have a second strap/hook member with a second length of strap windable around the take up reel at a second proximal end and a second hook affixed to a second distal end there-of. The second length of strap may have a midsection between its second proximal and distal ends, passing through and engageable by the ratchet spool such that rotation of the spool causes the midsection to be wound there-around.

The take up reel may be adapted to retain at least a portion of the second proximal end wound therearound during a storage condition and to rotate to dispense the second proximal therefrom during or in preparation for a use condition. The ratcheting mechanism may have a crank for selectably engaging the ratchet spool. The crank may be pivotable relative to the body into at least a dispensing condition and a ratcheting condition; wherein during the dispensing condition, the crank is extended directly away from the body and causes the spool to allow the midsection to be pulled freely therethrough or there-from, and wherein during the ratcheting condition, the crank is pivotable over a ratcheting range and engages the spool to cause the spool to wind the midsection there-around and prevent the midsection from being pulled therethrough or there-from. The ratcheting strap device may include a lock for selectably preventing inadvertent rotation of the take-up reel. The ratcheting strap device may include a belt adaptable to surround the device during the storage condition to retain one or both of the hooks against the body.

The invention may also be embodied in or practiced using a ratcheting strap device with an elongate body having a reel axis towards a first end and a ratcheting mechanism towards a second end opposite there-from. The ratcheting mechanism may be affixed to the body, and have a spool axis and a ratchet spool rotatable relative to the body there-about. The device may include a first strap/hook member having a first length of strap affixed to a first one of the ratcheting mechanism, and having a first hook affixed to a first distal end there-of. A take-up reel may be affixed to the body and rotational relative thereto about the reel axis. The device may include a second strap hook member with a second length of strap having a second proximal end connectable to the take-up reel, having a take-up strap portion adjacent to the second proximal end and windable around the take up reel, and having a second hook affixed to a second distal end there-of. The second length of strap may have a midsection between its second proximal and distal ends, passing through and engageable by the ratchet spool such that rotation of the spool causes the midsection to be wound there-around. The take up reel may be adapted to retain at least a portion of the take-up strap portion wound there-around during a storage condition and to rotate to dispense the take-up strap portion therefrom during or in preparation for a use condition. The ratcheting mechanism may have a crank, pivotable relative to the body, for selectably engaging a toothed ratchet wheel integral with the ratchet spool such that pivoting the crank within a ratcheting range causes a one-directional rotation of the ratchet spool about the spool axis, causing the midsection to be wound around the rotating spool. The crank may be pivotable relative to the body into a dispensing position wherein the crank is extended directly away from the body and disengages from the toothed ratchet wheel, allowing the spool to rotate freely about the spool axis to allow the midsection to be pulled freely therethrough or there-from. When the crank is within the ratcheting range, it may prevent the midsection from being pulled there-through or there-from. A lock may selectably prevent inadvertent rotation of the take-up reel. A belt may be adaptable to surround the device during the storage condition to retain one or both of the hooks against the body.

Further features and aspects of the invention are disclosed with more specificity in the detailed description and drawings provided herein.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION OF EXEMPLARY EMBODIMENT

Referring to FIGS. 1 through 8, an exemplary ratcheting strap 100 according to or for use in practicing the invention is disclosed. The ratcheting strap includes a body 101, a short strap/hook 102, a long strap/hook 104, a ratchet mechanism 106, a take-up reel 108 for storing and dispensing the long strap/hook through the ratcheting mechanism, and a hook/loop belt 110 for retaining the ratcheting mechanism and straps/hooks in a compact configuration for storage. The short strap/hook has a proximal end 103 affixed to the body and ratcheting mechanism and a distal end 105 equipped with a hook 107. The long strap/hook has a proximal end 109 connected to the reel and a distal end 111 equipped with a hook 113.

Figures 1, 2:
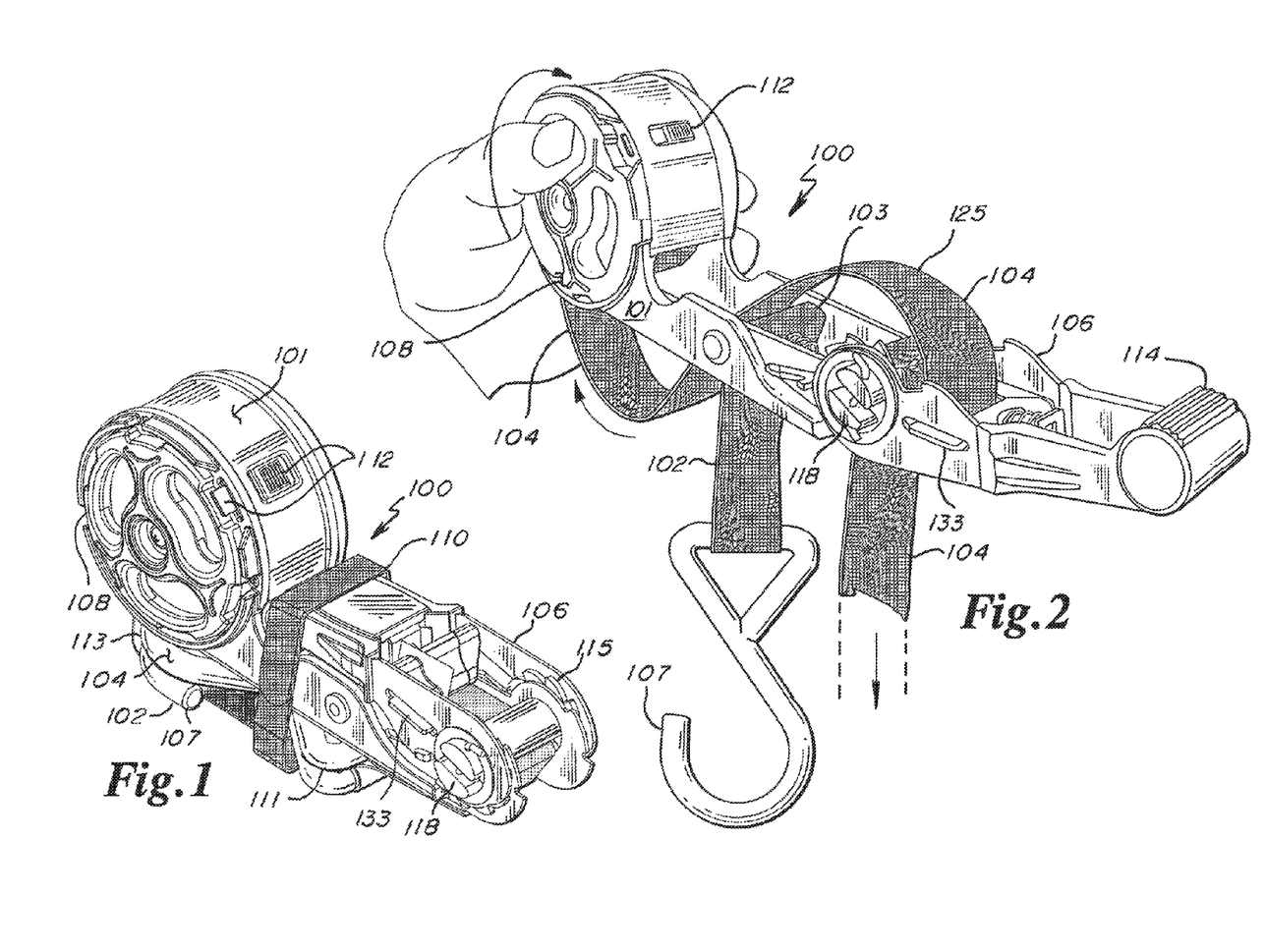
FIG. 1 is a perspective view of a ratcheting strap in accordance with an exemplary embodiment, in its storage configuration with its reel locked.
FIG. 2 is a perspective view of the ratcheting strap of FIG. 1 with its reel unlocked, dispensing its extendible strap.
Figure 4:
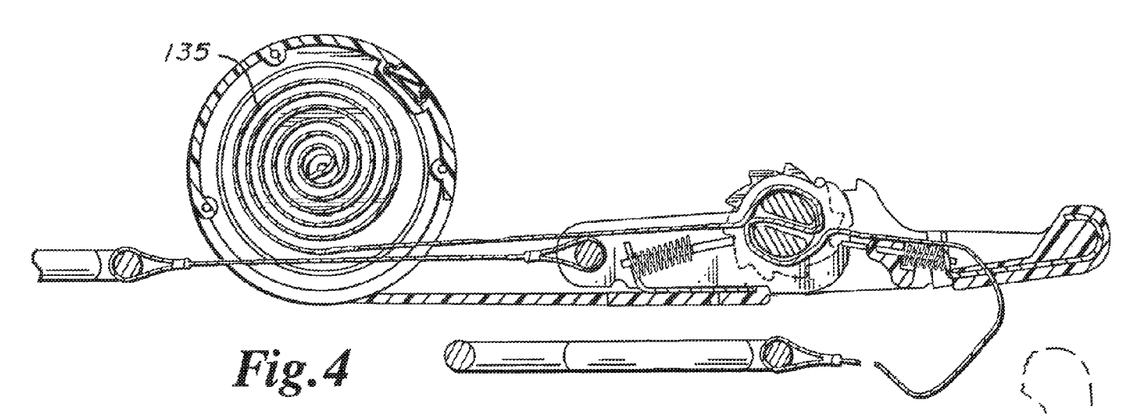
FIG. 4 is a side cross-sectional view of the ratcheting strap of FIG. 1 dispensing its extendible strap.
Figure 5:
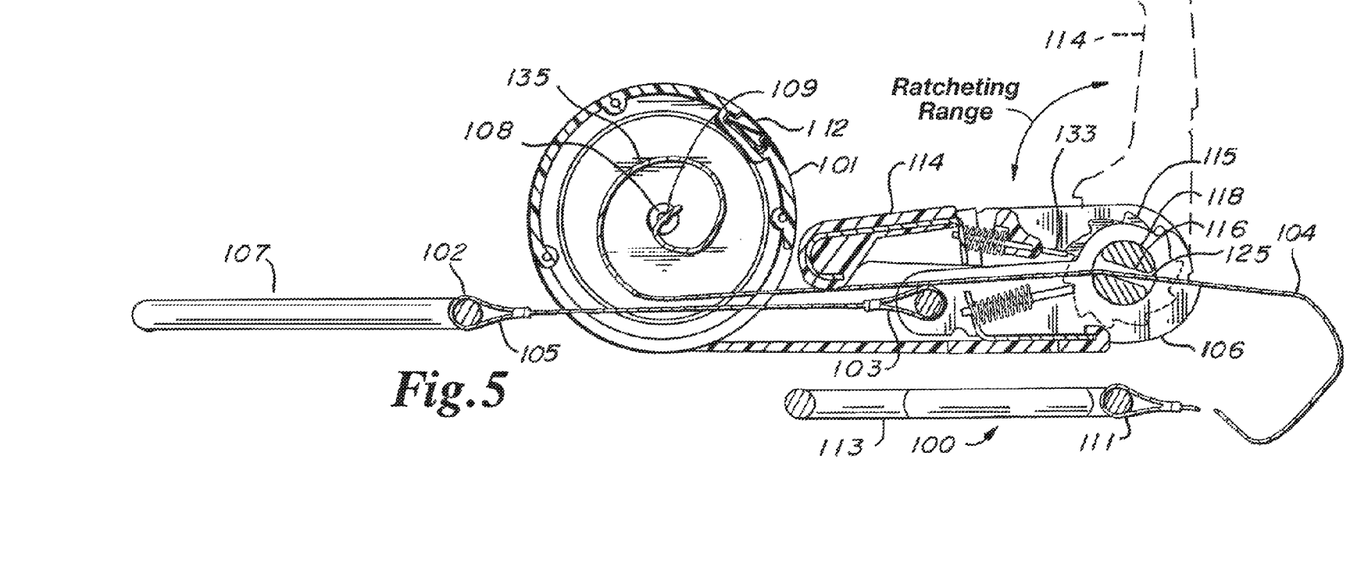
FIG. 5 is a side cross-sectional view of the ratcheting strap of FIG. 1 in its ratcheting condition but with none of its long strap wound around its spool so that it may be extended.
Figures 7A, 7B:
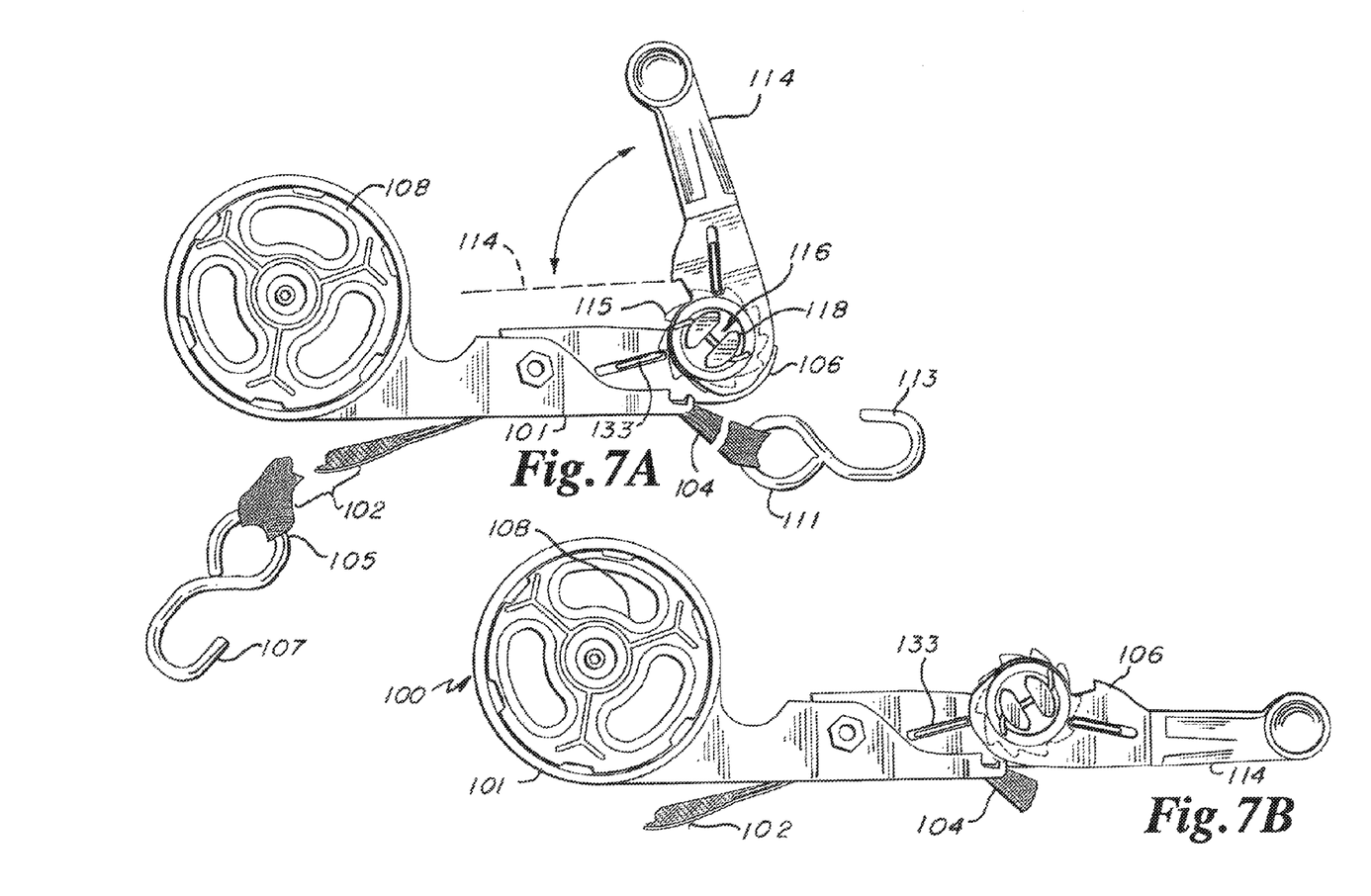
FIG. 7A is a side view of the ratcheting strap of FIG. 1 in its ratcheting condition.
FIG. 7B side view of the ratcheting strap of FIG. 1 in its extendible condition.
Figure 8:
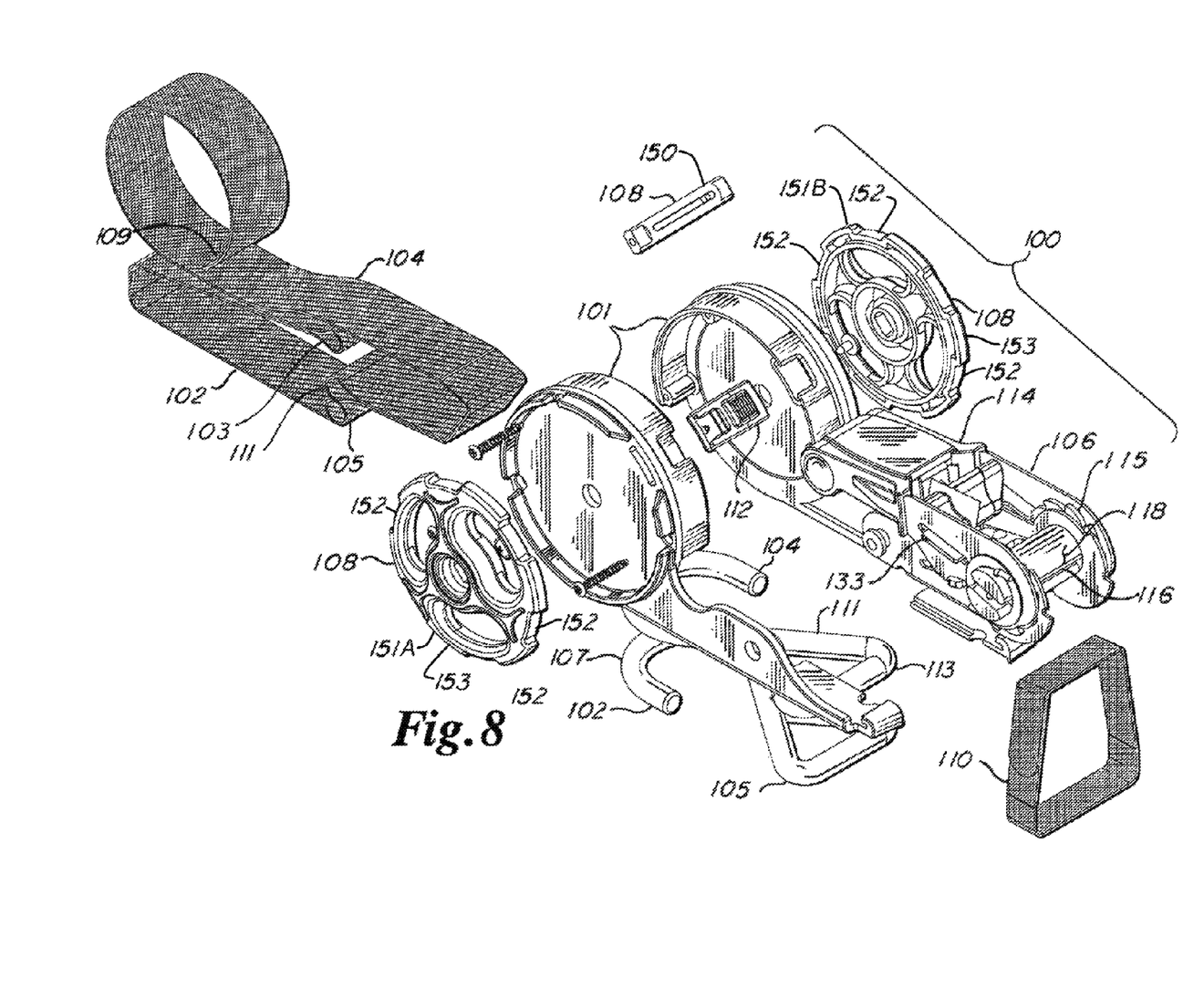
FIG. 8 is an exploded perspective view of the ratcheting strap of FIG. 1.

FIG. 1 shows the ratcheting strap in its storage configuration with belt 110 wrapped around the straps/hooks and ratcheting mechanism. The take-up portion 135 of the long strap/hook closest to its distal end is wound around reel 108. Pawl 112 is slidable sideways to lock the reel to prevent it from being rotated relative to body 101 and thereby prevent it from inadvertently dispensing any of the long strap/hook. In FIGS. 2, 4, and 7B, pawl 112 has been slid to its unlocked position, and the crank 114 of the ratcheting mechanism has been swung to its fully opened dispensing condition. By now tugging on the long strap/hook, it causes the reel to rotate relative to the body and dispense the long strap/hook therefrom, which passes through slot 116 of the ratcheting mechanism's selectively rotatable spool 118.

The take up reel 108 is a central core 150 with large circular flanges 151A and 151B at both ends. Those flanges have recesses 152 spaced evenly around their perimeters which pass entirely through the thicknesses of the flanges and which are engaged by the pawl when it is slid sideways. By having the recesses in the outer perimeter 153 of the flanges and having them pass entirely through the flanges it gives optimal strength and advantage to the locking feature.

Figures 6A, 6B:
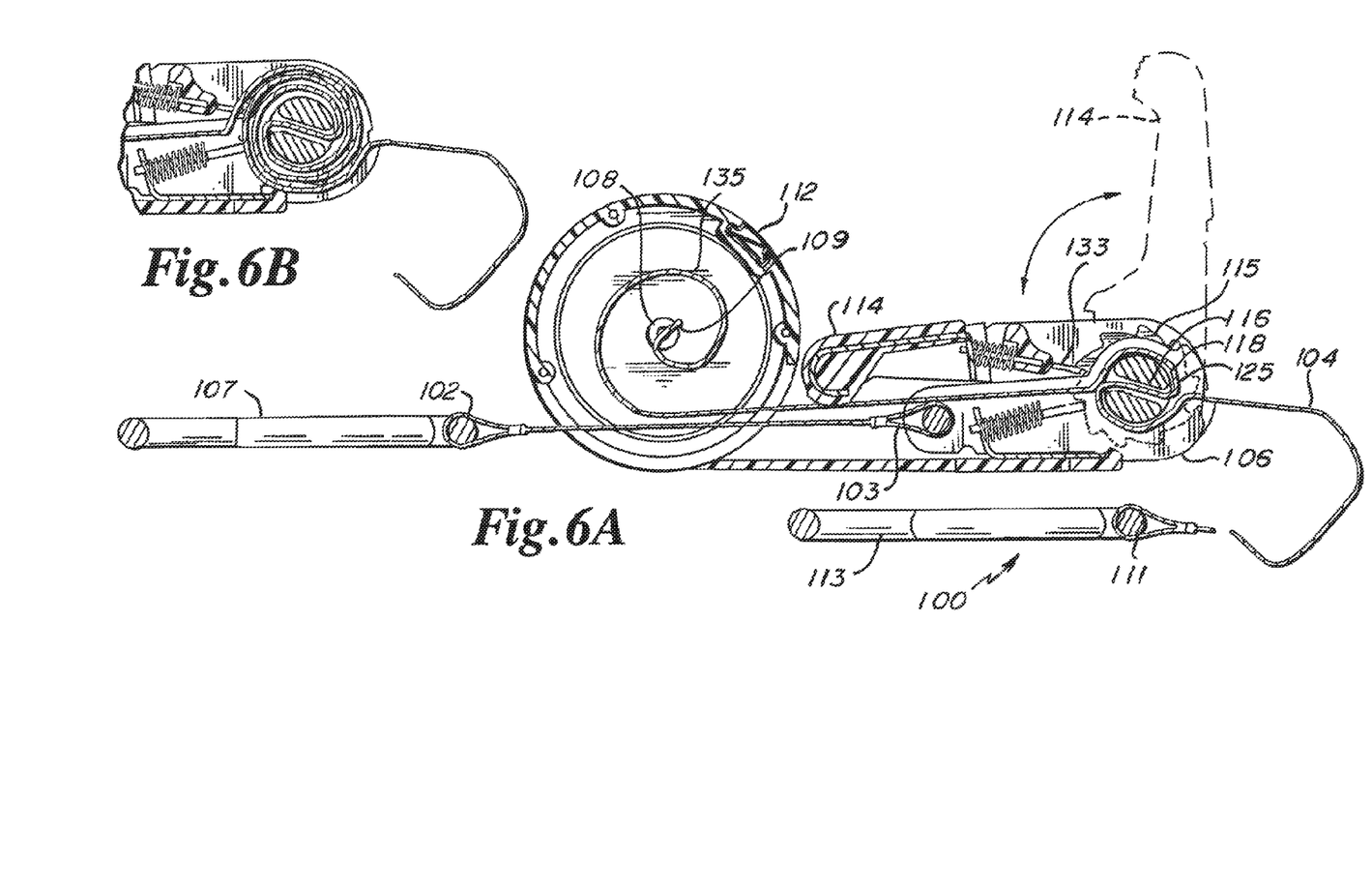
FIG. 6A is a side cross-sectional view of the ratcheting strap of FIG. 1 in its in its ratcheting condition with some of its long strap wound around its spool so that it may not be extended.
FIG. 6B is a partial side cross-sectional view of the ratcheting strap of FIG. 1 in its in its ratcheting condition with more of its long strap wound around its spool.

The portion of the long strap/hook that passes through or may be wound around the spool will be referred to as its midsection 125. Of course, that portion will change along the strap as it is dispensed, so the entirety of the long strap/hook between its portion wrapped around the reel and its hooked distal end 111 may serve as the midsection at any given time. When the spool is in the condition of FIG. 5 and has none of the midsection wound around it, the long strap/hook may be freely pulled there-through for dispensing regardless of the crank's position. When some of the midsection is wound around the spool, as seen in FIGS. 6A and 6B, the crank must be swung out to its dispensing position, shown in FIGS. 2, 4, and 7B, to allow the spool to freely rotate so that the long strap/hook may be dispensed. This is made possible by disengagement of the ratchet pawl 133 from the toothed ratchet wheel 115, which is integral with the spool, during the crank's dispensing condition.

When the crank is swung inward as shown in FIGS. 3, 5, 6A, and 7A, the ratchet pawl engages the toothed ratchet wheel and prevents rotation thereof and of the spool except as caused by cranking the crank, so that dispensing of the long strap/hook is denied. When the crank is within that ratcheting range, shown in FIG. 5, pivoting of the crank repeatedly back and forth between the positions shown causes the toothed wheel and spool to rotate in clockwise direction (in that view), and wind the long strap/hook around the spool with great mechanical advantage.

Figure 3:
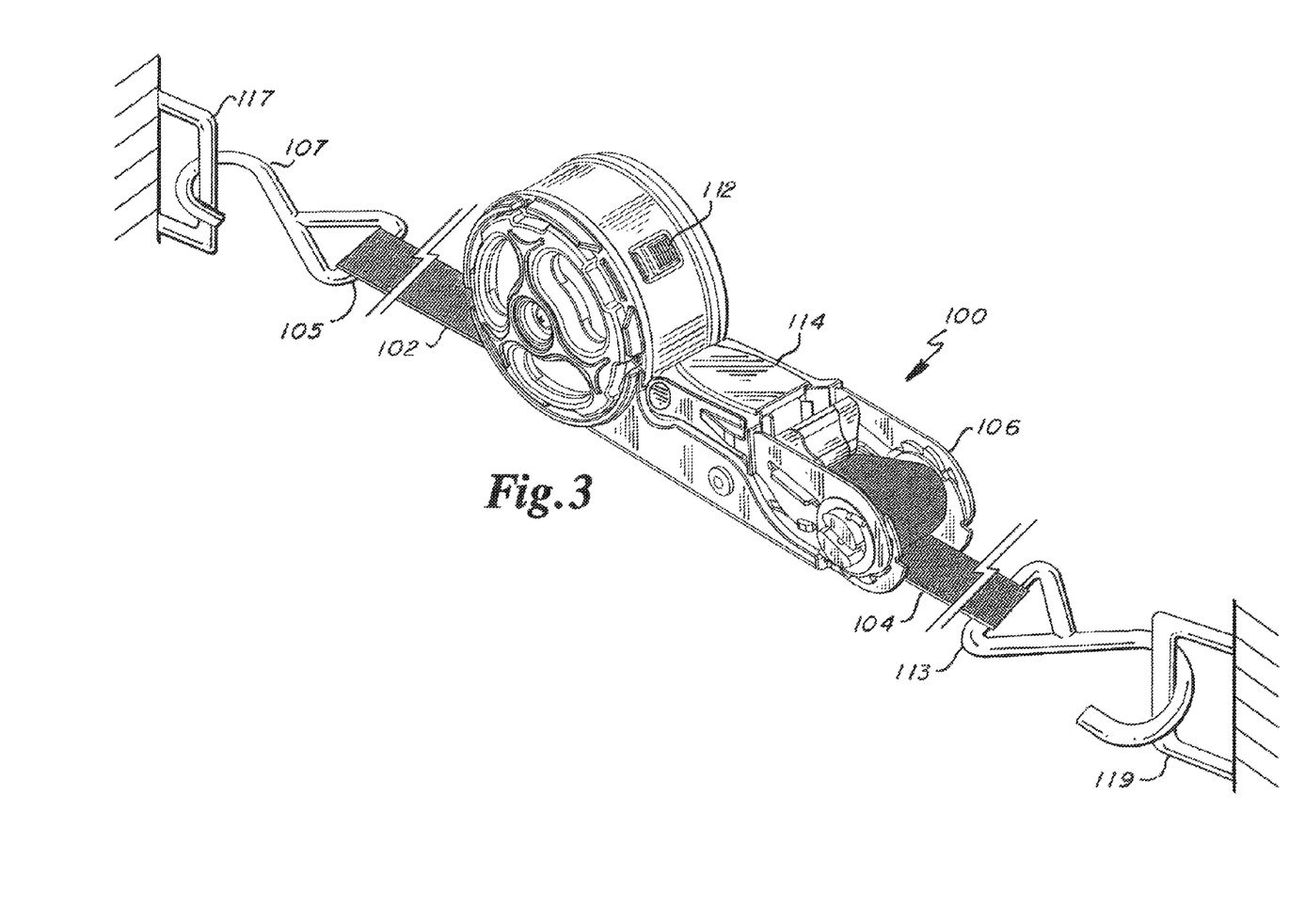
FIG. 3 is a perspective view of the ratcheting strap of FIG. 1 with its straps extended and hooked.

Referring to FIG. 3, with hook 107 hooked onto a first anchoring feature 117 of an automobile or such, the long strap/hook can now be pulled out and passed around an object to be secured (not shown), until it reaches a proper length for its hook 113 to be hooked to a second anchoring feature 119.

Next, the ratcheting mechanism can be activated by swinging the crank in and out within its ratcheting range, as shown in FIG. 7A to pull in and tighten the long strap/hook and tightly secure the object. During this ratcheting, the long strap/hook is wound tightly around spool 118 with great available force to firmly secure the object. The engagement of the crank's ratcheting pawl with the toothed ratchet wheel allows the spool to be rotated by the crank in a tightening direction, but prevents it from rotating in a loosening direction even when the crank is released.

Any slack that may have developed in the long strap/hook between the spool and reel 108 may be taken up by reverse-rotating the reel, then sliding the locking pawl 112 to its locked position to prevent the reel from further rotating in either direction.

Such ratcheting mechanisms including the slotted spool, toothed ratchet wheel, crank, and ratchet pawl are well known and will not be further described herein for brevity, but are exemplified by U.S. Pat. Nos. 5,271,606 and 7,874,047, the entire teachings of which are incorporated herein by reference. Among the advantages of the present invention are the take-up reel and its related features used in conjunction with such a mechanism, for neatly containing the long strap/hook both during use and during storage.

FIG. 9 is an exploded view of ratcheting strap 100.

While the reel is shown in a form that would be wound by hand, an alteration is anticipated in which the reel is spring-loaded like a typical tape measure.

It should be noted that the embodiment shown herein is not intended to limit the scope of the invention. The invention should only be limited by the follow claims, including any equivalent interpretation to which they are entitled.

I claim:

1. A ratcheting strap device comprising:
   a body;
   a ratcheting mechanism affixed to, and comprising a ratchet spool rotatable relative to, the body;
   a first strap/hook member comprising a first length of strap affixed to one of the ratcheting mechanism and the body at a first proximal end, and having a first hook affixed to a first distal end there-of;
   a take-up reel affixed to the body and rotational relative thereto;
   the take-up reel comprising a cylindrical central core having circular flanges coaxially disposed at each end thereof and rotatable therewith, the flanges having identical outer diameters, and each having a thickness, the outer diameters having recesses equally spaced thereabout which pass entirely through the thicknesses of the flanges;
   a sideways-slidable pawl selectably engageable with the recesses to prevent rotation of the reel relative to the body or dis-engageable from the recesses to allow rotation of the reel relative to the body; the sideways-slidable pawl being adapted to remain in the selected of the engaged and unengaged positions when released; and
   a second strap hook member comprising a second length of strap windable around the take up reel at a second proximal end and having a second hook affixed to a second distal end there-of; the second length of strap further comprising a midsection between its second proximal and distal ends, passing through and engageable by the ratchet spool such that rotation of the spool causes the midsection to be wound there-around.

2. The ratcheting strap device of claim 1 wherein the take up reel is adapted to retain at least a portion of the second proximal end wound therearound during a storage condition and to rotate to dispense the second proximal therefrom during or in preparation for a use condition.

3. The ratcheting strap device of claim 2 wherein the ratcheting mechanism further comprises a crank for selectably engaging the ratchet spool.

4. The ratcheting strap device of claim 3 wherein the crank is pivotable relative to the body into at least a dispensing condition and a ratcheting condition; wherein during the dispensing condition, the crank is extended directly away from the body and causes the spool to allow the midsection to be pulled freely therethrough or therefrom, and wherein during the ratcheting condition, the crank is pivotable over a ratcheting range and engages the spool to cause the spool to wind the midsection there-around and prevent the midsection from being pulled therethrough or there-from.

5. The ratcheting strap device of claim 1 further comprising a belt adaptable to surround the device during the storage condition to retain one or both of the hooks against the body.

6. The ratcheting strap device of claim 5 wherein the take up reel is adapted to retain at least a portion of the second proximal end wound therearound during a storage condition and to rotate to dispense the second proximal therefrom during or in preparation for a use condition.

7. The ratcheting strap device of claim 6 wherein the ratcheting mechanism further comprises a crank for selectably engaging the ratchet spool.

8. The ratcheting strap device of claim 7 wherein the crank is pivotable relative to the body into at least a dispensing condition and a ratcheting condition; wherein during the dispensing condition, the crank is extended directly away from the body and causes the spool to allow the midsection to be pulled freely therethrough or therefrom, and wherein during the ratcheting condition, the crank is pivotable over a ratcheting range and engages the spool to cause the spool to wind the midsection there-around and prevent the midsection from being pulled therethrough or there-from.

9. A ratcheting strap device comprising:
   an elongate body having a reel axis towards a first end and a ratcheting mechanism towards a second end opposite there-from;
   the ratcheting mechanism affixed to the body, and comprising a spool axis and a ratchet spool rotatable relative to the body there-about;
   a first strap/hook member comprising a first length of strap affixed to one of the ratcheting mechanism and the body at a first proximal end, and having a first hook affixed to a first distal end there-of;
   a take-up reel affixed to the body and rotational relative thereto about the reel axis;
   the take-up reel comprising a cylindrical central core having circular flanges coaxially disposed at each end thereof and rotatable therewith, the flanges having identical outer diameters, and each having a thickness, the outer diameters having recesses equally spaced thereabout which pass entirely through the thicknesses of the flanges;
   a sideways-slidable pawl selectably engageable with the recesses to prevent rotation of the reel relative to the body or dis-engageable from the recesses to allow rotation of the reel relative to the body; the sideways-slidable pawl being adapted to remain in the selected of the engaged and unengaged positions when released; and a second strap hook member comprising a second length of strap having a second proximal end connectable to the take-up reel, having a take-up strap portion adjacent to the second proximal end and windable around the take up reel, and having a second hook affixed to a second distal end there-of; the second length of strap further comprising a midsection between its second proximal and distal ends, passing through and engageable by the ratchet spool such that rotation of the spool causes the midsection to be wound there-around.

10. The ratcheting strap device of claim 9 wherein the take up reel is adapted to retain at least a portion of the take-up strap portion wound therearound during a storage condition and to rotate to dispense the take-up strap portion therefrom during or in preparation for a use condition.

11. The ratcheting strap device of claim 10 wherein the ratcheting mechanism further comprises a crank, pivotable relative to the body, for selectably engaging a toothed ratchet wheel integral with the ratchet spool such that pivoting the crank within a ratcheting range causes a one-directional rotation of the ratchet spool about the spool axis, causing the midsection to be wound around the rotating spool.

12. The ratcheting strap device of claim 11 wherein the crank is further pivotable relative to the body into a dispensing position; wherein during the dispensing position, the crank is extended directly away from the body and disengages from the toothed ratchet wheel, allowing the spool to rotate freely about the spool axis to allow the midsection to be pulled freely therethrough or there-from, and wherein when the crank is within the ratcheting range, it prevents the midsection from being pulled therethrough or there-from.

13. The ratcheting strap device of claim 9 further comprising a belt adaptable to surround the device during the storage condition to retain one or both of the hooks against the body.

14. The ratcheting strap device of claim 13 wherein the take up reel is adapted to retain at least a portion of the take-up strap portion wound therearound during a storage condition and to rotate to dispense the take-up strap portion therefrom during or in preparation for a use condition.

15. The ratcheting strap device of claim 14 wherein the ratcheting mechanism further comprises a crank, pivotable relative to the body, for selectably engaging a toothed ratchet wheel integral with the ratchet spool such that pivoting the crank within a ratcheting range causes a one-directional rotation of the ratchet spool about the spool axis, causing the midsection to be wound around the rotating spool.

16. The ratcheting strap device of claim 15 wherein the crank is further pivotable relative to the body into a dispensing position; wherein during the dispensing position, the crank is extended directly away from the body and disengages from the toothed ratchet wheel, allowing the spool to rotate freely about the spool axis to allow the midsection to be pulled freely therethrough or there-from, and wherein when the crank is within the ratcheting range, it prevents the midsection from being pulled therethrough or there-from.

* * * * *